United States Patent
Francis et al.

(10) Patent No.: US 10,284,887 B2
(45) Date of Patent: May 7, 2019

(54) SYSTEM AND METHOD TO ASSIST SYNCHRONIZATION OF DISTRIBUTED PLAY OUT OF CONTENT

(71) Applicant: THOMSON LICENSING, Issy les Moulineaux (FR)

(72) Inventors: Scott Francis, Danville, CA (US); William Gibbens Redmann, Glendale, CA (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 14/896,755

(22) PCT Filed: Jun. 20, 2013

(86) PCT No.: PCT/US2013/046676
§ 371 (c)(1),
(2) Date: Dec. 8, 2015

(87) PCT Pub. No.: WO2014/204459
PCT Pub. Date: Dec. 24, 2014

(65) Prior Publication Data
US 2016/0142749 A1    May 19, 2016

(51) Int. Cl.
*H04N 21/242*    (2011.01)
*H04N 21/43*    (2011.01)
(Continued)

(52) U.S. Cl.
CPC .......... *H04N 21/242* (2013.01); *H04H 20/18* (2013.01); *H04N 21/233* (2013.01);
(Continued)

(58) Field of Classification Search
CPC ............. H04N 21/242; H04N 21/4302; H04N 21/4788; H04N 21/4394; H04N 21/233
See application file for complete search history.

(56) References Cited

U.S. PATENT DOCUMENTS

| 5,548,324 A | 8/1996 | Downs et al. |
| 5,808,662 A | 9/1998 | Kinney et al. |

(Continued)

FOREIGN PATENT DOCUMENTS

| CN | 101502111 A | 8/2009 |
| EP | 1126709 | 8/2001 |

(Continued)

OTHER PUBLICATIONS

Boronat et al., "Smooth Control of Adaptive Media Playout to Acquire IDMS in Cluster-based Applications," 36th Annual IEEE Conf. on Local Computer Networks, LCN 2011, Bonn, 2011 IEEE, pp. 613-621.

(Continued)

*Primary Examiner* — Pinkal R Chokshi
(74) *Attorney, Agent, or Firm* — Tutunjian & Bitetto, P.C.

(57) ABSTRACT

A method for synchronizing content undergoing play out at first and second stations commences by comparing audio within content undergoing play out on the first station to the audio within content undergoing play out on the second station to determine if a latency exists between the first and second stations. If such a latency exists, then at least one of a pause or jump operations is performed in connection with content playing out by at least one of the first and second stations for an interval corresponding to an interval by which one station leads the other station to bring the two stations into substantial synchronism.

13 Claims, 8 Drawing Sheets

(51) Int. Cl.
*H04N 21/4788* (2011.01)
*H04H 20/18* (2008.01)
*H04N 21/233* (2011.01)
*H04N 21/439* (2011.01)
*H04N 21/472* (2011.01)
*H04N 21/6587* (2011.01)

(52) U.S. Cl.
CPC ..... *H04N 21/4302* (2013.01); *H04N 21/4394* (2013.01); *H04N 21/4788* (2013.01); *H04N 21/47217* (2013.01); *H04N 21/6587* (2013.01)

(56) References Cited

U.S. PATENT DOCUMENTS

| | | | |
|---|---|---|---|
| 5,896,128 A | 4/1999 | Boyer | |
| 6,653,545 B2 | 11/2003 | Redmann et al. | |
| 6,678,700 B1* | 1/2004 | Moore | G06F 17/30233 |
| 6,754,904 B1 | 6/2004 | Cooper et al. | |
| 6,894,714 B2 | 5/2005 | Gutta et al. | |
| 7,076,447 B1 | 7/2006 | Peyser et al. | |
| 7,146,330 B1 | 12/2006 | Alon et al. | |
| 7,236,615 B2 | 6/2007 | Miller et al. | |
| 7,318,051 B2 | 1/2008 | Weston et al. | |
| 7,518,051 B2 | 4/2009 | Redmann | |
| 7,528,860 B2 | 5/2009 | Harville et al. | |
| 7,600,247 B2 | 10/2009 | Onomatsu | |
| 7,620,206 B2 | 11/2009 | Ohba | |
| 7,669,219 B2 | 2/2010 | Scott, III | |
| 7,817,180 B2 | 10/2010 | Jeong et al. | |
| 7,818,770 B2 | 10/2010 | Ducheneaut et al. | |
| 7,849,145 B2 | 12/2010 | Kang et al. | |
| 7,865,834 B1 | 1/2011 | van Os et al. | |
| 7,873,983 B2 | 1/2011 | Ducheneaut et al. | |
| 7,882,530 B2 | 2/2011 | Ducheneaut et al. | |
| 7,921,156 B1 | 4/2011 | Stolorz et al. | |
| 7,970,661 B1 | 6/2011 | Abraham et al. | |
| 8,060,525 B2 | 11/2011 | Svendsen et al. | |
| 8,126,268 B2 | 2/2012 | Rossato et al. | |
| 8,271,334 B1 | 9/2012 | Funk et al. | |
| 8,417,535 B2 | 4/2013 | Kusumoto et al. | |
| 8,527,334 B2 | 9/2013 | Porter et al. | |
| 8,606,634 B2 | 12/2013 | Porter et al. | |
| 8,677,282 B2 | 3/2014 | Cragun et al. | |
| 8,830,293 B2 | 9/2014 | Mauchly et al. | |
| 8,957,918 B2 | 2/2015 | Godavari | |
| 9,490,998 B1 | 11/2016 | Danciu et al. | |
| 2002/0099774 A1 | 7/2002 | Yamato et al. | |
| 2002/0138831 A1 | 9/2002 | Wachtfogel et al. | |
| 2004/0003413 A1 | 1/2004 | Boston et al. | |
| 2004/0015999 A1 | 1/2004 | Carlucci | |
| 2004/0054577 A1 | 3/2004 | Inoue | |
| 2004/0080611 A1 | 4/2004 | Kakii et al. | |
| 2004/0194131 A1 | 9/2004 | Ellis et al. | |
| 2005/0091311 A1 | 4/2005 | Lund et al. | |
| 2005/0227614 A1* | 10/2005 | Hosking | H04N 7/165 455/3.06 |
| 2005/0248474 A1* | 11/2005 | Wiser | G11B 20/10527 341/50 |
| 2005/0286466 A1 | 12/2005 | Tagg et al. | |
| 2006/0010170 A1* | 1/2006 | Lashley | G06F 12/0813 |
| 2006/0013557 A1 | 1/2006 | Poslinski | |
| 2006/0101062 A1 | 5/2006 | Godman et al. | |
| 2006/0136960 A1 | 6/2006 | Morris | |
| 2006/0161835 A1* | 7/2006 | Panabaker | G11B 27/10 715/203 |
| 2006/0174312 A1* | 8/2006 | Ducheneaut | H04N 5/76 725/135 |
| 2006/0190966 A1 | 8/2006 | McKissick et al. | |
| 2006/0218577 A1 | 9/2006 | Goodman et al. | |
| 2006/0236352 A1* | 10/2006 | Scott, III | H04N 5/76 725/89 |
| 2006/0282856 A1 | 12/2006 | Errico et al. | |
| 2007/0022375 A1 | 1/2007 | Walker | |
| 2007/0039449 A1 | 2/2007 | Redmann | |
| 2007/0055566 A1 | 3/2007 | Gaughan et al. | |
| 2007/0156520 A1 | 7/2007 | Sharma | |
| 2007/0157114 A1 | 7/2007 | Bishop et al. | |
| 2007/0266400 A1 | 11/2007 | Rogers | |
| 2008/0103879 A1 | 5/2008 | Armstrong | |
| 2008/0133647 A1 | 6/2008 | Hamzeh | |
| 2008/0168505 A1 | 7/2008 | Saito et al. | |
| 2008/0249961 A1 | 10/2008 | Harkness et al. | |
| 2008/0266380 A1 | 10/2008 | Gorzynski et al. | |
| 2008/0307412 A1 | 12/2008 | Marr et al. | |
| 2009/0024718 A1 | 1/2009 | Anagnostopoulos | |
| 2009/0030774 A1 | 1/2009 | Rothschild et al. | |
| 2009/0033737 A1 | 2/2009 | Goose et al. | |
| 2009/0109278 A1 | 4/2009 | Karnalkar et al. | |
| 2009/0132356 A1 | 5/2009 | Booth et al. | |
| 2009/0132383 A1 | 5/2009 | Piepenbrink et al. | |
| 2009/0133069 A1 | 5/2009 | Conness et al. | |
| 2009/0169171 A1 | 7/2009 | Massey et al. | |
| 2009/0215538 A1 | 8/2009 | Jew | |
| 2009/0232285 A1 | 9/2009 | Mani | |
| 2009/0240771 A1 | 9/2009 | Capobianco | |
| 2009/0251599 A1 | 10/2009 | Kashyap et al. | |
| 2009/0293079 A1 | 11/2009 | McKee et al. | |
| 2009/0307047 A1 | 12/2009 | Cook et al. | |
| 2009/0315974 A1 | 12/2009 | Matthews | |
| 2009/0328122 A1 | 12/2009 | Amento et al. | |
| 2010/0030648 A1 | 2/2010 | Manolescu et al. | |
| 2010/0043020 A1 | 2/2010 | Basso | |
| 2010/0066804 A1 | 3/2010 | Shoemake et al. | |
| 2010/0082727 A1 | 4/2010 | Zalewski | |
| 2010/0085416 A1 | 4/2010 | Hegde et al. | |
| 2010/0100923 A1* | 4/2010 | Toiyama | H04N 21/2365 725/131 |
| 2010/0114692 A1 | 5/2010 | Steelberg et al. | |
| 2010/0122394 A1 | 5/2010 | Scott, III | |
| 2010/0131385 A1 | 5/2010 | Harrang et al. | |
| 2010/0146133 A1* | 6/2010 | Perrin | H04L 51/24 709/229 |
| 2010/0153577 A1 | 6/2010 | Wohlert et al. | |
| 2010/0171807 A1 | 7/2010 | Tysso | |
| 2010/0171848 A1 | 7/2010 | Peters et al. | |
| 2010/0199310 A1 | 8/2010 | Newell | |
| 2010/0223119 A1 | 9/2010 | Klish | |
| 2010/0302446 A1 | 12/2010 | Mauchly | |
| 2010/0318405 A1 | 12/2010 | Kirby | |
| 2011/0040634 A1 | 2/2011 | Landsberry et al. | |
| 2011/0050995 A1 | 3/2011 | Ozawa et al. | |
| 2011/0090302 A1 | 4/2011 | Leviav et al. | |
| 2011/0131616 A1 | 6/2011 | Cho | |
| 2011/0138018 A1 | 6/2011 | Raveendran et al. | |
| 2011/0145881 A1 | 6/2011 | Hartman et al. | |
| 2011/0154386 A1 | 6/2011 | Cochinwala et al. | |
| 2011/0154417 A1 | 6/2011 | Civanlar et al. | |
| 2011/0173672 A1 | 7/2011 | Angiolillo et al. | |
| 2011/0191288 A1 | 8/2011 | Spears | |
| 2011/0218656 A1 | 9/2011 | Bishop et al. | |
| 2011/0219405 A1 | 9/2011 | McRae | |
| 2011/0246421 A1* | 10/2011 | Takahashi | G06Q 10/06 707/626 |
| 2011/0261142 A1 | 10/2011 | Shanmukhadas et al. | |
| 2011/0264532 A1 | 10/2011 | Chan et al. | |
| 2011/0316853 A1 | 12/2011 | Bar-Zeev et al. | |
| 2012/0026277 A1 | 2/2012 | Malzbender et al. | |
| 2012/0038742 A1 | 2/2012 | Robinson et al. | |
| 2012/0054278 A1 | 3/2012 | Taleb et al. | |
| 2012/0084160 A1 | 4/2012 | Badros et al. | |
| 2012/0163315 A1* | 6/2012 | Govindappa | H04L 1/1874 370/329 |
| 2012/0166349 A1 | 6/2012 | Dedis et al. | |
| 2012/0239506 A1 | 9/2012 | Saunders et al. | |
| 2012/0257112 A1 | 10/2012 | Fritsch | |
| 2012/0314077 A1 | 12/2012 | Clavenna, II et al. | |
| 2013/0030987 A1 | 1/2013 | Zuckerberg et al. | |
| 2013/0045758 A1* | 2/2013 | Khorashadi | H04W 4/029 455/456.3 |
| 2013/0076980 A1* | 3/2013 | Oren | H04N 5/04 348/500 |
| 2013/0125153 A1 | 5/2013 | Nilson et al. | |
| 2013/0173742 A1 | 7/2013 | Thomas et al. | |

(56) References Cited

U.S. PATENT DOCUMENTS

| | | |
|---|---|---|
| 2013/0211971 A1 | 8/2013 | Lin et al. |
| 2013/0212610 A1 | 8/2013 | Hussain et al. |
| 2013/0246155 A1 | 9/2013 | Kandanala et al. |
| 2013/0282454 A1 | 10/2013 | Alpert et al. |
| 2013/0290098 A1 | 10/2013 | Steelberg et al. |
| 2013/0303591 A1 | 11/2013 | Brown et al. |
| 2013/0304582 A1 | 11/2013 | Beazley et al. |
| 2013/0304591 A1 | 11/2013 | Murray et al. |
| 2013/0347033 A1 | 12/2013 | Grab et al. |
| 2014/0139620 A1 | 5/2014 | Redmann et al. |
| 2014/0215535 A1* | 7/2014 | Elliott ............... H04N 21/2387 725/81 |
| 2014/0359079 A1* | 12/2014 | Weill ............... H04L 65/4076 709/219 |
| 2015/0019667 A1 | 1/2015 | Redmann |
| 2015/0074716 A1 | 3/2015 | Redmann et al. |
| 2015/0089372 A1* | 3/2015 | Mandalia ............... G11B 27/10 715/720 |
| 2015/0095931 A1* | 4/2015 | Duong ............... H04N 21/4394 725/19 |
| 2015/0199727 A1 | 7/2015 | Naveh |
| 2015/0256584 A1* | 9/2015 | Sakaguchi ........ H04L 12/2812 709/219 |
| 2016/0014371 A1 | 1/2016 | Huber et al. |
| 2016/0066000 A1* | 3/2016 | Cunningham ....... H04N 21/242 725/116 |

FOREIGN PATENT DOCUMENTS

| | | |
|---|---|---|
| EP | 2202970 | 6/2010 |
| JP | 1997282133 | 10/1997 |
| JP | 2002218277 A | 8/2002 |
| JP | 2003163911 A | 6/2003 |
| JP | 2004135062 A | 4/2004 |
| JP | 2006041885 A | 2/2006 |
| JP | 2006108947 A | 4/2006 |
| JP | 2006345121 A | 12/2006 |
| JP | 2008539611 A | 11/2008 |
| JP | 2010206349 A | 9/2010 |
| JP | 2011114870 A | 6/2011 |
| KR | 2003023415 A | 3/2003 |
| KR | 747699 B1 | 8/2007 |
| KR | 812903 | 3/2008 |
| KR | 939904 | 2/2010 |
| KR | 20110125548 | 11/2011 |
| WO | WO2004032507 | 4/2004 |
| WO | 2011166476 A1 | 12/2011 |
| WO | WO2012008972 | 1/2012 |
| WO | WO2012162721 | 12/2012 |
| WO | WO2013019259 | 2/2013 |
| WO | WO2013103583 | 7/2013 |
| WO | 2013133863 A1 | 9/2013 |
| WO | 2013165341 A2 | 11/2013 |
| WO | 2014055058 A1 | 4/2014 |
| WO | 2014066290 A1 | 5/2014 |
| WO | 2014168616 A1 | 10/2014 |
| WO | 2014175876 A1 | 10/2014 |

OTHER PUBLICATIONS

Levent-Levi, "What Layouts Should a Dual Video System Support? VoIP Survivor," http://blog.radvision.com/voipsurvivor/2009/12/07/what-layouts-should, Dec. 7, 2009, 3 pages.

Pan et al., "Real-Time Collaborative Video Watching on Mobile Devices with REST Services," 2012 Third FTRA Int'l. Conference on Mobile, Ubiquitous, and Intelligent Computing, 2012 IEEE, pp. 29-34.

Ishikawa et al., "The design of a set-top box with video encoder and its application to video conferencing," EUROPTO Symposium on Broadband European Networks, Zurich, Switzerland, May 1998, SPIE vol. 3408, pp. 592-602.

Zarros et al., "Interparticipant Synchronization in Real-Time Multimedia Conferencing Using Feedback," IEEE/ACM Transactions on Networking, vol. 4, No. 2, Apr. 1996, New York, NY, USA, pp. 173-180.

Fan et al., "Learning to Predict Ad Clicks Based on Boosted Collaborative Filtering," IEEE Int'l. Conf. on Social Computing/ IEEE Int'l. Conf. on Privacy, Security, Risk and Trust, 2010 IEEE, pp. 209-216.

Han et al., "Four-way Video Conference in Home Server for Digital Home," 2006 IEEE, 6 pages.

Cheung, "Robust Techniques for Background Subtraction in Urban Traffic Video", Proceedings of SPIE The International Society for Optical Engineering, vol. 5308, Oct. 2003, 12 pages.

Goderbauer, "Syncro-Concurrent Editing Library for Google Wave", ICWE 2010: Web Engineering, Jul. 2010, pp. 510-513.

"Fluxid/syncplay", https://github.com/fluxid/syncplay/blob/master/syncplay/client.py, Feb. 18, 2012, 7 pages.

\* cited by examiner

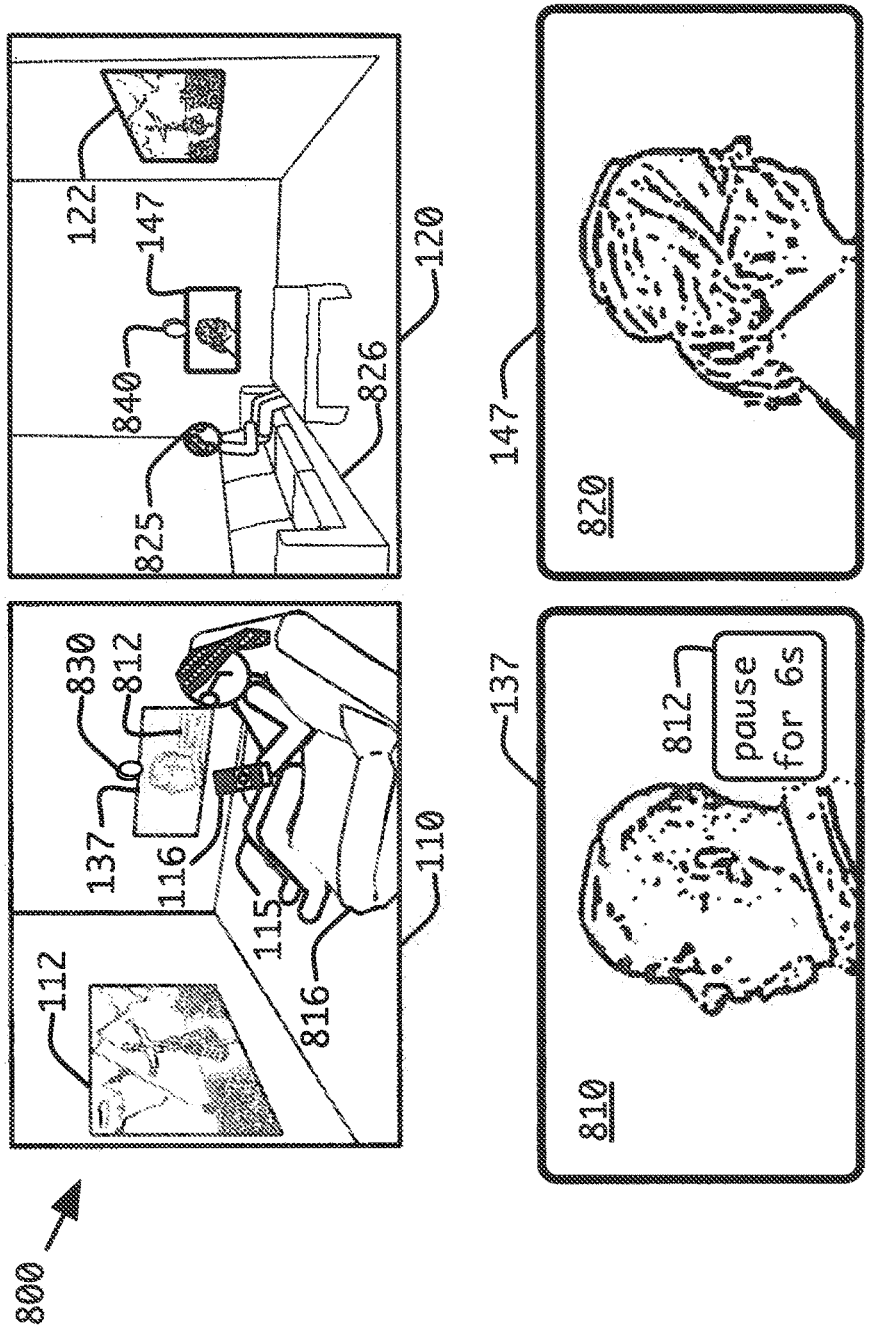

US 10,284,887 B2

SYSTEM AND METHOD TO ASSIST SYNCHRONIZATION OF DISTRIBUTED PLAY OUT OF CONTENT

This application claims the benefit, under 35 U.S.C. § 365 of International Application PCT/US13/046676 filed Jun. 20, 2013, which was published in accordance with PCT Article 21(2) on Dec. 24, 2014 in English.

TECHNICAL FIELD

Advances in video equipment and network transmission has led to the development of affordable video conference systems that enable individuals, or groups of individuals, at separate locations to simultaneously watch content while sharing video images and audio information with each other across conventional networks without requiring inordinately high bandwidth. The terms "telepresence" and "social TV" refer to this type video conferencing. When teleconference participants watch the same television show, whether from the same or different content sources, the timing of the play out of content to individual participants can differ substantially. Causes of the timing difference include differences in the content feed (e.g., one group receives the content via a terrestrial broadcast while another receives the content via a satellite signal or over-the-top streaming), differences in equipment (e.g., each participant receives the content via a digital video recorder or 'DVR', but with different imposed delays), or different content start times (e.g., with DVDs, video-on-demand, or over-the-top streaming). Other than for live television broadcasts from the same transmitter received by a non-DVR receiver, difficulties arise in providing play out of the television show in a substantially synchronized manner to multiple stations Several systems provide synchronization between a television program playing locally (regardless of the source of the content, such as a DVD or the like) and separate content tracked to it. The "RiffPlayer" application by RiffTrax, LLC of San Diego, Calif. synchronizes a humorous commentary track to a DVD by listening to the audio as the DVD plays out. The "MediaEcho" application by Technicolor Creative Services USA, Inc. offers a similar capability for DVDs and broadcast TV and embodies the invention in International Patent Application PCT/US12/071822, filed Dec. 12, 2012.

Such techniques address synchronization in the context of a single content source. However, a need exists for achieving synchronization in the context of different content sources.

BRIEF SUMMARY OF THE INVENTION

Briefly, in accordance with an illustrated embodiment of the present principles, a method for synchronizing content undergoing play out at first and second stations commences by comparing audio within content undergoing play out on the first station to the audio within content undergoing play out on the second station to determine if a latency exists between the first and second stations. If such a latency exists, then at least one of a pause or jump operations is performed in connection with content playing out by at least one of the first and second stations for an interval corresponding to an interval by which one station leads the other station to bring the two stations into substantial synchronism.

BRIEF DESCRIPTION OF THE DRAWINGS

FIG. 8 depicts vignettes that represent the situations at each of the stations of the telepresence system of FIG. 1 in connection with synchronization in accordance with the present principles.

DETAILED DESCRIPTION

Figure 1:
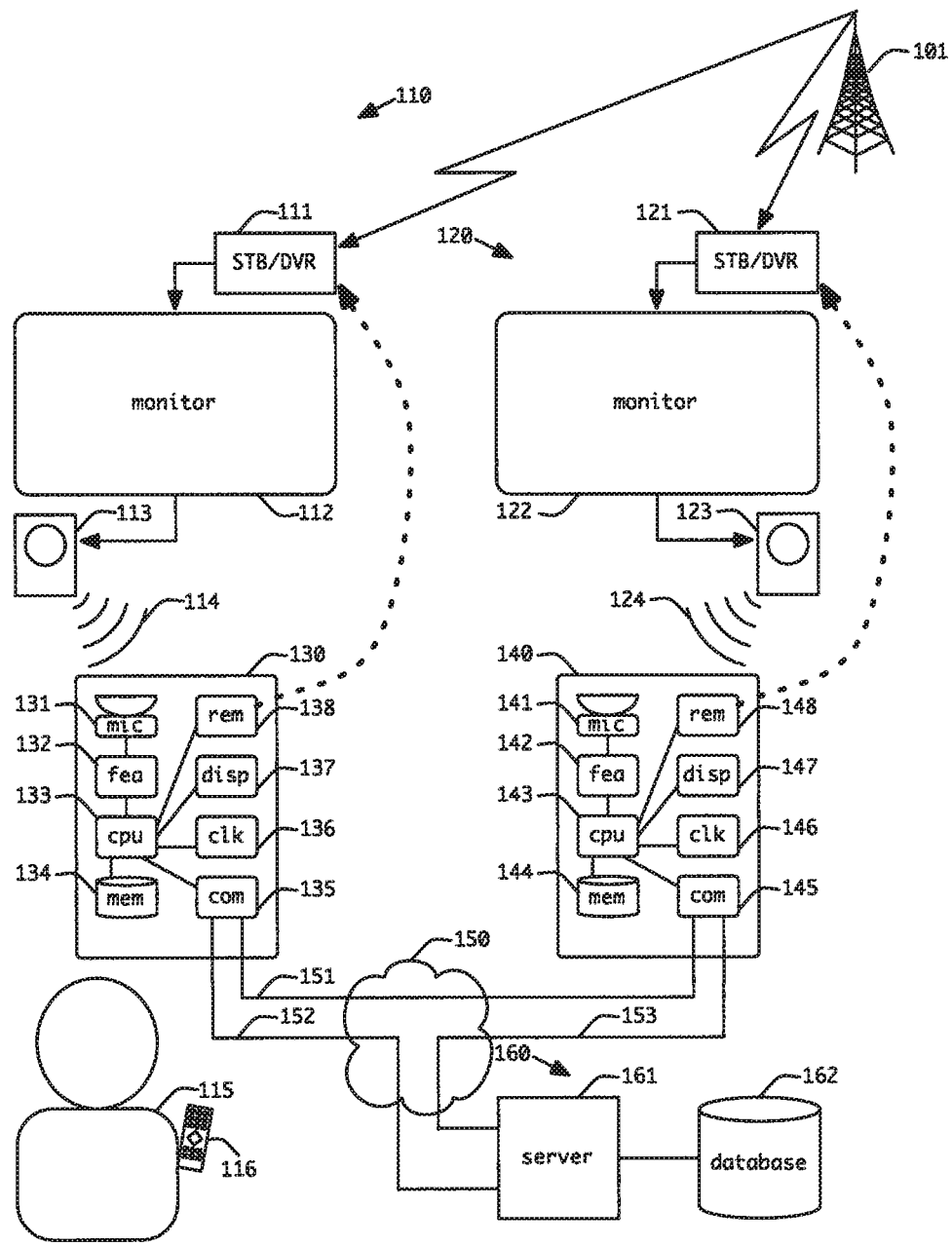
FIG. 1 depicts a block schematic of a telepresence system showing two stations, each displaying content to a corresponding telepresence participant and for synchronizing such content in accordance with the present principles.

FIG. 1 depicts a block schematic of a telepresence system comprised of two stations 110 and 120 that play the same content (e.g., a television program, movie), also herein called "a media program." Such content can include audio-visual programs, video-only programs or audio-only programs. In the illustrated embodiment of FIG. 1, a broadcaster 101 supplies content to the stations 110 and 120 for receipt by players 111 and 121, respectively at such stations. Each player could comprise, in combination, a receiver (e.g. a television set) tuned to receive broadcasts from the broadcaster 101, and a digital video recorder (DVR). In other embodiments, the players 111 and 121 could comprise a DVR and a set-top box, the later receiving content from any of a satellite provider, cable television provider. Alternatively, the players could comprise a receiver for an Internet streaming provider (e.g., Netflix of Los Gatos, Calif.). Each player could receive content from a digital video disk player (DVD) (not shown). The two players 111 and 121 need not have identical form nor do they have require the same source of content (e.g., broadcaster 101), though the content must be the same, even if some elements within the content (e.g., commercials) differ. At least one of the stations has the ability to pause and/or skip backwards or rewind through the content, and in particular, the ability to pause and/or skip backwards or rewind through at least through that portion of the content that has recently played.

The stations 110 and 120 have monitors 112 and 122, respectively, for displaying the content as it plays out on the players 111 and 121, respectively. The stations 110 and 120 also include speakers 113 and 123, respectively, for reproducing accompanying audio 114 and 124, respectively, associated with the content undergoing play out at the stations. Generally, each station has a user, exemplified by the user 115 at the station 110. During a telepresence session, the users at the stations execute steps to interconnect their stations to each other via an audio/video, video only or audio only conference call, as discussed in greater detail with respect to FIG. 8. The user 115 at the station 110 can use a remote control 116 for control of the player 111 and/or the monitor 112. Although not shown, the users at the other stations typically have remote controls as well.

The stations 110 and 120 have synchronization units 130 and 140, respectively, each comprising one of microphones 131 and 141, respectively, for capturing audio 114 and 124, respectively. The synchronization units 130 and 140 also include feature detection modules 132 and 142, respectively, for extracting features from the audio captured by the corresponding microphones 131 and 141, respectively. Within each of the synchronization units 130 and 140, a corresponding one of central processing units (CPU) or controller 133 and 143, respectively, processes and stores the extracted features into one of memories 134 and 144, respectively. Communication modules 135 and 145, in communication with the CPU 133 and 143, respectively, can send the extracted features to the other synchronization unit(s) via a communication channel 151, which may comprise the Internet 150.

Accordingly, the CPUs 133 and 143 in the synchronization units 130 and 140, respectively, also receive remote features via communication channel 151 and their respective communication module 135 and 145, and can determine information about the synchronization of content from the detected local features and the received remote features. Within the synchronization units 130 and 140, displays 137 and 147, respectively, can display the synchronization information. In some embodiments, the CPUs 133 and 143 in the synchronization units 130 and 140, respectively, can drive remote control emitters 138 and 148, respectively, to command the transport of players 111 and 121, respectively, (or set-top boxes or DVD players, etc.) to pause, rewind, skip backward, resume, as necessary to remedy a timing difference in the play out of among the stations to achieve synchronization in accordance with the present principles.

In the illustrated embodiment of FIG. 1, the synchronization units 130 and 140 exist as stand-alone devices. However, each of the players 111 and 121 or each of the monitors 112 and 122 could include embedded synchronization units 130 and 140. Embedding the synchronization units 130 and 140 in the monitors the monitor 112 and 122, respectively, would enable the monitors to display the synchronization information in place of the displays 137 and, 147, respectively.

The synchronization units 130 and 140 of FIG. 1 can make use of a presence service 160 to find each other, although other techniques could serve this purpose. The presence service 160 comprises a presence server 161 and a database 162 for tracking the existence, availability, and location of the synchronization units 130 and 140 at the stations 110 and 120, respectively. The synchronization unit 130 and 140 communicate with the presence server 161 by through corresponding communication modules 135 and 145, respectively, and communication channels 152 and 153, respectively, each of which may comprise the Internet 150. In this way, the synchronization units 130 and 140 can exchange messages with each other through the presence server 161 in lieu of directly communicating through the communication channel 151. In connection with the illustrated embodiment, each of the communication modules 135 and 145 determines the address of other communication module(s) by communicating with the server 161 through the communication channel 151. However, the transactions between synchronization units 130 and 140 could occur directly, (as through the communication channel 151), or indirectly, as mediated by the presence server 161.

The features extracted by the feature detectors 132 and 142 undergo storage in the local memories 134 and 144, respectively, to form a first timeline of recent, local audio features at each station. The communication modules 135 and 145 also store the remote features they receive in local memories 134 and 144, respectively, to form a second timeline of recent, remote audio features. The two timelines remain generally synchronized, that is, the same position in each timeline represents features that occurred at about the same time at the corresponding stations.

In some embodiments, the synchronization units 130 and 140 can maintain local clocks 136 and 146, respectively, synchronized to each other, or to another commonly accessible clock (not shown, but provided by server 161 or by another service, for example using the well-known network time protocols). In other embodiments, the communication latencies between the synchronization units 130 and 140 (via the communication channel 151) may be considered insignificant (e.g., less than ¼ second) or fixed to a predetermined value (e.g., ½ second). In still other embodiments, measurement of the communication latencies could occur once, or periodically, by measuring the round-trip communication time and dividing by two, again using well known methods for this purpose. In embodiments where the clocks 136 and 146 exist, the synchronization units 130 and 140 can time-stamp the communications between stations 110 and 120, respectively. For those embodiments where the clocks 136 and 146 do not exist, features received from the remote station can undergo storage at the local station in sequence and be considered current (or only delayed by the predetermined or measured latency), and buffered in memory accordingly. Messages that carry such features can include a sequence number so that messages (and therefore features) lost in transit do not affect the placement of those features received in the timeline. Thus, with or without clocks 136 and 146, placement the local and remote features into their respective timelines in memory at each station can occur in a manner such that features obtained at the same time at each station appear similarly placed in the corresponding timelines in the memories.

Figure 2:
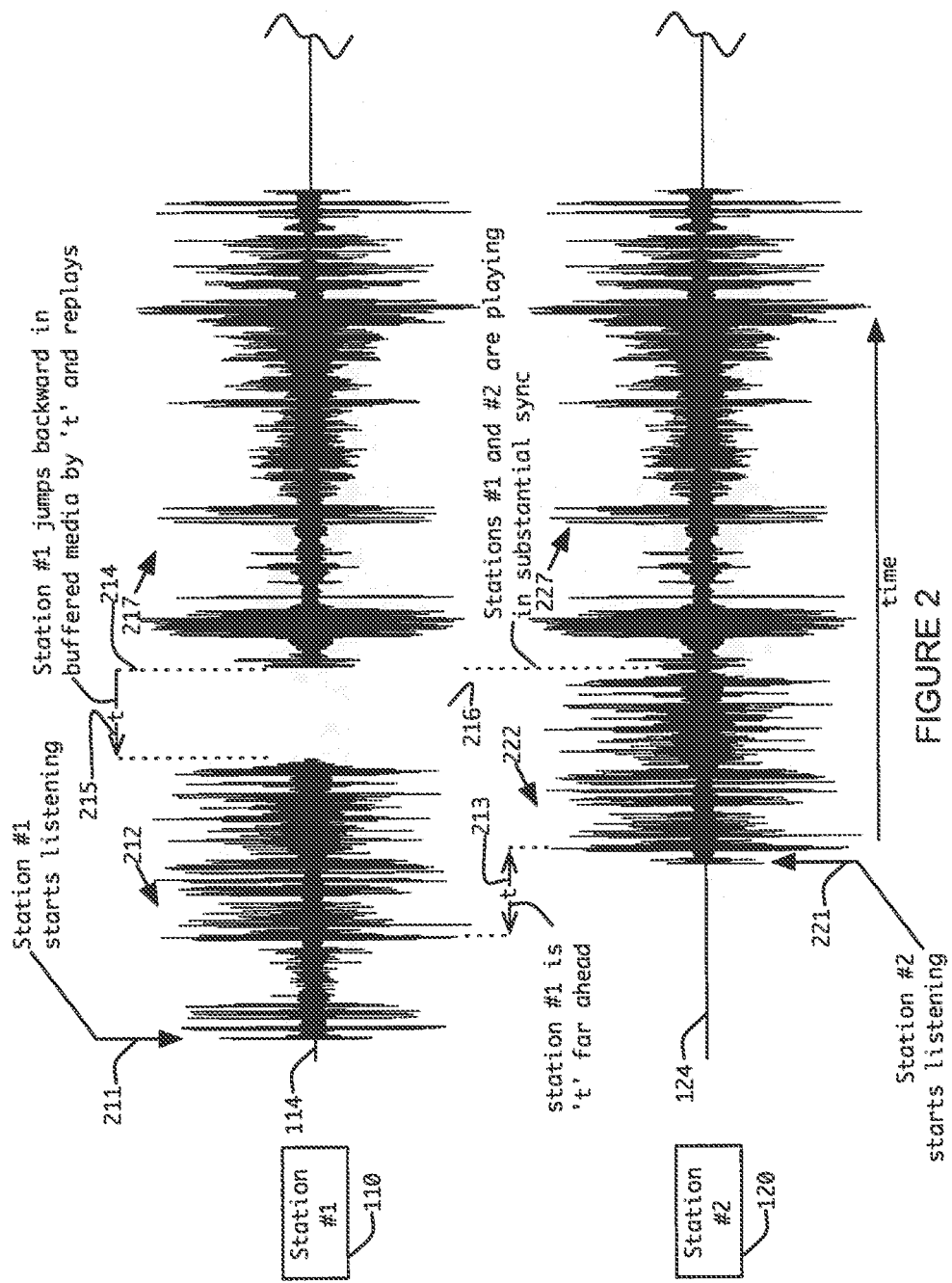
FIG. 2 depicts a time line representation of the audio signals comprising part of the content undergoing play out at the two stations of the telepresence system of FIG. 1 where the stations achieve synchronization by the lead station jumping backward in the content by the amount of its lead.

FIG. 2 illustrates the method of synchronization of the present principles performed by the synchronization units 130 and 140 of FIG. 1. The waveform appearing at the top of FIG. 2 has an envelope progressing along a timeline beginning at the left-hand side and advancing rightward and represents the situation at the station 110 where the audio 114 plays from the speaker 113. The waveform appearing at the bottom of FIG. 2 has an envelope progressing along the timeline and represents the situation at the station 120 where the audio 124 plays from the speaker 123 of FIG. 1. The station 110 begins to listen at the time 211, whereas the station 120 starts listening at the time 221. Assuming that communication exists between the stations 110 and 120 across the communications channel 151 of FIG. 1, the stations 110 and 120 can exchange extracted features detected by their detectors 132 and 142, respectively, from their local audio signals 114 and 124, respectively. Shortly after the time 221, the station 110 will receive enough extracted features from the audio 124 at the station 120 to determine that matching features appear earlier that time 221 in the audio 114, as buffered in the memory 134. Typically, a station needs about 10 seconds of time for such feature extraction and recognition, although the recognition time could be longer or shorter depending upon the embodiment of the feature detectors and the characteristics currently exhibited by the audio program. By noting the amount of time elapsed between the features received from station 120 and those matched in the memory 134, the station 110 can determine that the audio 114 leads the audio 124 by a mutual latency 213, which corresponds to an amount of time "t". In other words, the audio portion 212 of the content currently plays out at a time "t" earlier than (or "ahead of") the audio portion 222.

At the time 214, synchronization unit 130 commands the player 111 (e.g., an STB, DVR, DVD, streaming media player, etc.) to skip backward in the content by an amount 215 substantially equal to "t" (the magnitude of the mutual latency 213). The audio portion 216 (shown in FIG. 2 as hashed) will replay from the media buffer of the player 111 such that the portion 217 of the audio 114 begins at the time 214 with a repeat of the portion 216 and continues (rightward along the timeline of FIG. 2). The beginning of the portion 217 substantially matches and lies in synchronism with the portion 227 (i.e., after the time 214, the audio 124 plays in substantial synchronism with the audio 114). Thus, as time progresses after the time 214, the audio 114 and 124 at the stations 110 and 120 are substantially synchronized with each other, so the other content (e.g., video) is likewise synchronized.

In a situation where more than two stations attempt to synchronize, the station furthest ahead will attempt to synchronize with the station furthest behind the others. Assume for purposes of discussion that the station 120 remains the furthest behind the other stations in terms of the lag in audio. Thus, if the station 110 recognizes that it lies ahead of one or more other stations, then the station 110 will choose to synchronize with the station most behind it, that is, the station for which the latency measurement 213 (i.e., where "t" has the greatest value. All of the stations that lie ahead (i.e., their audio leads that of the "behind" station) follow this procedure. Ultimately, all the stations will become synchronized with the most-behind station and thereby become substantially synchronized with each other. A station, such as station 120, that finds itself behind all of the other stations, in this embodiment, would take no action and would wait for other stations to synchronize with it.

In another embodiment, a station that lies behind could jump forward to catch up with the other stations. However, jumping forward can prove more difficult because of the uncertainty of whether a local player, such as the player 121 at the station 120, has already received that portion of the content over which the player needs to jump. Further, a jump forward through the remote content may have a widely varying response time (as with a streaming media source. It is also the case that there will be content not shown to a user of a station that jumps forward, because it was skipped over.

In still other embodiments, the synchronization responsibility could reside among several stations. For example, a station, such as station 120 that lies behind others could jump forward by an amount representing a large fraction, perhaps the majority of the initially noted mutual latency 213. After re-establishing the media stream (i.e., the content), the station 120, after some further interval, could detect and exchange features to allow determination of a revised, presumably smaller mutual latency. At this point, the "ahead" station 110 would make a precise jump backwards (as described above, but using the revised mutual latency) to achieve a more complete synchronization of content play out. This approach affords the advantage that the user 115 at the "ahead" station 110 need not repeat the entire interval corresponding to the initial mutual latency. Instead, the station 110 will only repeat a shorter revised latency. This approach remains preferable when the user 115 has begun watching a movie and a friend joining late has already seen at least the beginning of the movie and doesn't strictly need to see that part again. In other cases, where a late-joining user does want to see the movie from the beginning, the stations can employ the synchronization method described above with respect to FIG. 2 or the users can opt to watch something else.

Figure 3:
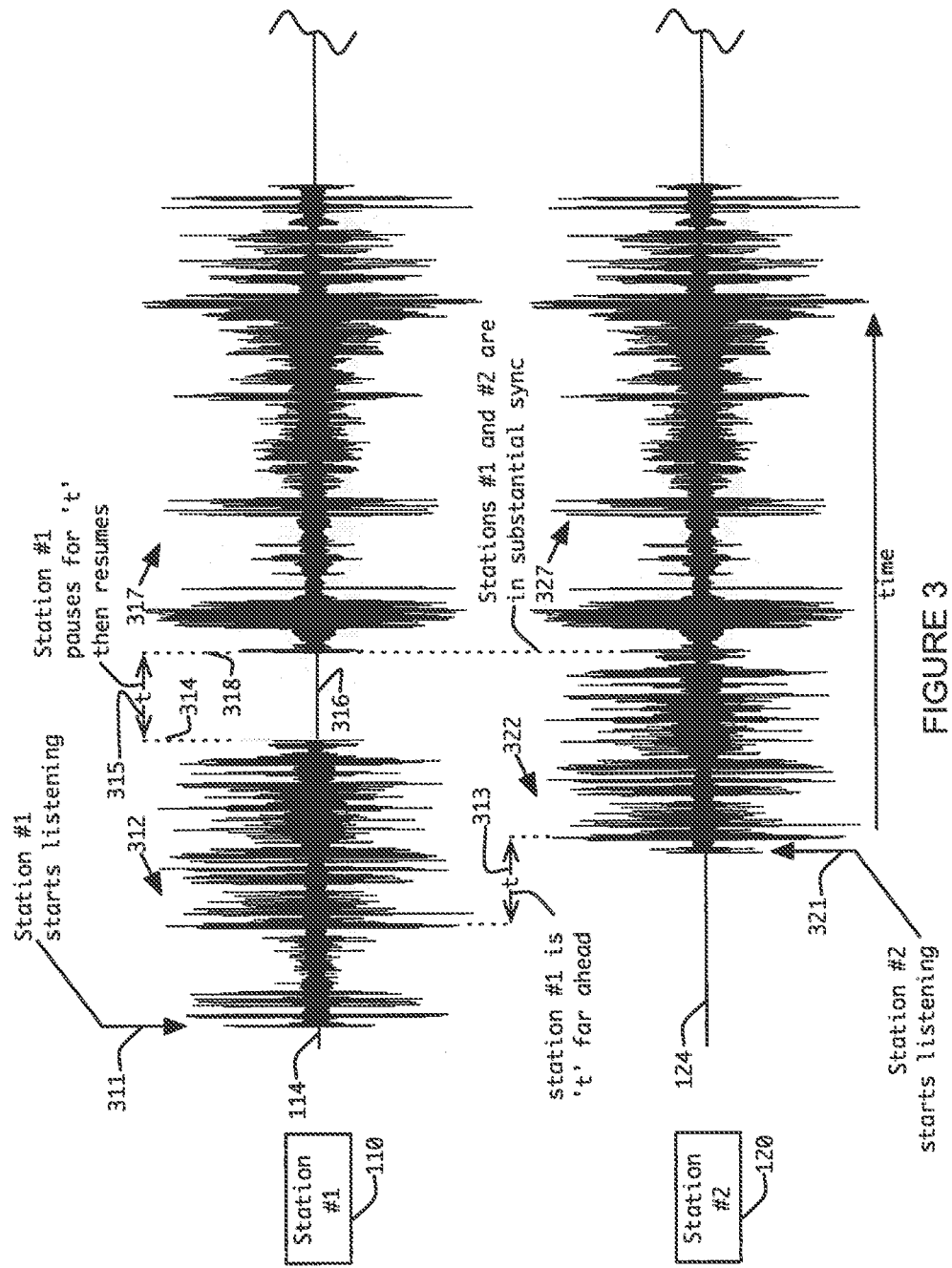
FIG. 3 depicts a time line representation of the audio signals comprising part of the content undergoing play out at the two stations of the telepresence system of FIG. 1, where the stations achieve synchronization by the lead station pausing during content play out for the amount of its lead in the content.

FIG. 3 illustrates an alternate method of synchronization, in accordance with the present principles, performed by the synchronization units 130 and 140 of FIG. 1, similar to that method depicted in FIG. 2. The waveform appearing at the top of FIG. 3, like the waveform at the top of FIG. 2, has an envelope progressing along a timeline beginning at the left-hand side of the figure and progressing rightward and represents the situation at the station 110 where the audio 114 plays from the speaker 113, all of FIG. 1. The waveform appearing at the bottom of FIG. 3 has an envelope progressing along the timeline and represents the situation at the station 120 where the audio 124 plays from the speaker 123, all of FIG. 1. The station 110 starts listening at the time 311 of FIG. 3, whereas the station 120 starts listening at the time 321 of FIG. 3. Assuming that communication exists between the stations 110 and 120 across the communications channel 151 of FIG. 1, the stations 110 and 120 can exchange the extracted features detected by their detectors 132 and 142, respectively, from their local audio signals 114 and 124, respectively.

Shortly after time 321, the station 110 will receive from the station 120 enough extracted features from the audio 124 to determine that matching features appear earlier in the audio 114, as buffered in the memory 134. By noting the amount of time elapsed between the features received from station 120 and those matched in the memory 134, the station 110 can determine that the audio 114 lies ahead of the audio 124 by the mutual latency 313, which corresponds to the time "t", which means that audio portion 312 is playing out time "t" earlier than (or "ahead of") audio portion 322. At time 314, synchronization unit 130 commands the player 111 to pause for the duration 315 substantially equal to "t", such that the audio portion 316 remains silent until the player 111 resumes at time 318 (after duration 315 has elapsed). This results in the portion 317 of the audio 114 substantially matched to, and substantially synchronized with the portion 327, i.e., the audio 124 after the time 318 (which is substantially time 314 plus "t"). Thus, as time progresses after the time 318, the audio 114 and 124 at the stations 110 and 120, respectively, becomes substantially synchronized, thereby substantially synchronizing the content undergoing play out at the two stations.

In some embodiments, at time 314, synchronization unit 130 can instruct user 115 through display 137 to issue commands with remote control 116 to player 111 to pause for duration 315 and resume when duration 315 is elapsed, as shown in FIG. 8.

Figure 4:
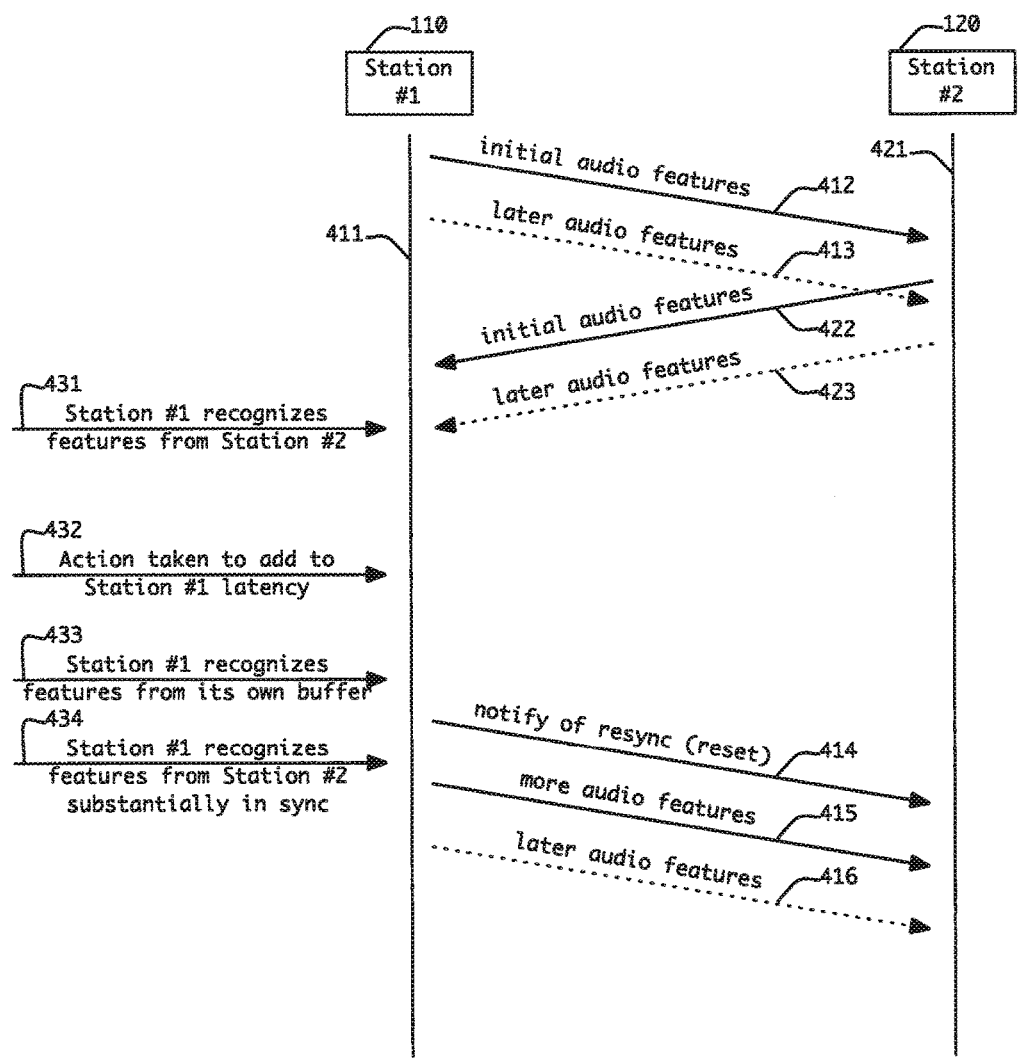
FIG. 4 depicts a set of transactions between the two stations of the telepresence system of FIG. 1 for performing the synchronizations of FIGS. 2 and 3.

FIG. 4 depicts a set of transactions between the two stations 110 and 120 of the telepresence system of FIG. 1 for performing the synchronizations of FIGS. 2 and 3. Vertical lines 411 and 421 each correspond to stations 110 and 120, with time advancing downward from top to bottom. To initiate synchronization, the station 110 sends an initial message 412 for later receipt at the station 120, the initial message indicated by an arrow bearing the same reference numeral (412) sloping downward from line 411 toward line 421. How much "later" depends on the transport latency of communication channel 151, but the typical latency remains less than 250 mS for intracontinental communications.

The initial message 412 originates from the synchronization unit 130 at station 110 (both of FIG. 1) for receipt at the synchronization unit 140 of station 120 (both of FIG. 1). The message 412 includes one or more features extracted from the audio 114 by the feature extraction module 132 (both of FIG. 1). If synchronization unit 130 includes its own clock 136, then synchronization unit can time stamp the message 412. Otherwise, the synchronization unit 130 will assign a sequence number to the message 412. Using the time stamp or the sequence number, the synchronization unit 140 at the station 120 can properly place the features sent via message 412 into the remote features timeline associated with that remote synchronization unit 130.

As a reaction to the connection with synchronization unit 130, or in response to receiving the message 412, the synchronization unit 140 will likewise begin sending audio features to the synchronization unit 130 of FIG. 1 in a message 422 depicted in FIG. 4. Independently, the synchronization unit 130 will send one or more subsequent messages 413 (only one shown for clarity) comprising further extracted audio features. Likewise, the synchronization unit 140 will send one or more subsequent messages 423 (also only one shown) comprising further extracted audio features.

As the initial message 412 undergoes transmission, the synchronization unit 130 may already be engaged for some period of time extracting and recording local audio features. The message 412 need not carry the earliest extracted features. Rather, the initial message 412 need only carry the most recent local features extracted by the feature detection module 132 of FIG. 1. In other embodiments, each synchronization unit could send additional messages to inform the remote station(s) of older features, extracted earlier, but no requirement exists to do so. As an example, the station 110 could begin recording the features of the local audio 114 at the time 311 (in FIG. 3) and continue to collect features extracted from the audio 114 thereafter. Upon connection with station 120 after about the time 321, the stations 110 and 120 of FIG. 1 can exchange initial messages 412 and 422, representing the features extracted from the audio at or near time 321. Upon receipt of the messages 422 and 423, the station 110 could find a match considerably earlier than the time 321. In this way, a station, such as the station 110, can recognize a match of features extracted earlier by as much as the size of the buffer provided in the memory 134 of FIG. 1, rather than only as long as the two stations have been exchanging messages.

Referring to FIG. 4, at the time 431 the station 110 will receive the message(s) 422 and perhaps one or more of the messages 423 and will then recognize a match, if any, between the remote audio features sent by station 120 and those local audio features recorded in the memory 134. The offset between where the matched features lie in their respective timelines constitutes the mutual latency 313 (or 213). This example illustrates that a station can find a match among some features not yet shared by one of the stations (i.e., where the station 110 has extracted features but not yet shared them with the station 120, but will match such features to those extracted and shared in the messages 422 and/or 423 by the station 120).

On the basis of the matching of local and remote features, the station 110 can determine the mutual latency 313 (or mutual latency 213) as constituting the amount "t" and either take action by issuing commands to the player 111 with the remote control emitter 138, or by posting synchronization information on display 137 for the user 115 to see and take the appropriate action (e.g., with remote 116). For example, the station 110 could send a command to the player 111 with remote control emitter 138 to skip backward by the amount "t" (as in FIG. 2) or to pause playout for a duration "t" and to resume afterwards, as in FIG. 3 or instruct user 115 through display 137 to do so using a separate remote control 116 for the player 111. An example of the posting of synchronization information appears in FIG. 8 discussed hereinafter. Sometime after taking the action to add the latency to station 110 at the time 432 in FIG. 4, (e.g., the player 111 of FIG. 1 has skipped backward or has paused and subsequently resumed play out), the microphone 131 will again detect the audio 114 and the feature detection module 132 of FIG. 1 will extract the features in the detected audio.

In the case of FIG. 2, after taking the action indicated at time 432, the synchronization unit 130 of FIG. 1 will seek to match features corresponding to the beginning of audio portion 217 to the features previously extracted in conjunction with audio interval 216, as at time 433. Upon finding a match, the synchronization unit 130 can determine the precise size of the corrective rewind step 215 of FIG. 2. If step 215 constitutes too small or too large a jump (e.g., more than 2 seconds off), then the synchronization unit 130 will take a follow-up action, such commanding the player to skip forward or backward to refine the adjustment in order to achieve content synchronization. Upon recognizing the recurrence of features from its own buffer at the time 433, the synchronization unit 130 can send a reset notification message 414 to the remote synchronization unit 140 to indicate an interruption in the continuity of the timeline of the station 110. This permits synchronization unit 140 to purge its buffer of remote features to avoid needless matching attempts with respect to a portion of a remote timeline that no longer remains valid.

In the case of FIG. 3, after the synchronization unit 130 associated with the station 110 adds the latency at the time 432, the recognition of features at the time 433 will not trigger the sending of a reset message 414, because the player 111 of FIG. 1 does not back up during content play out. Not until player 111 has become un-paused will the synchronization unit 130 again capture program audio and extract features from such audio. At this time, the synchronization unit 130 can observe that features received from the remote synchronization unit 140 match and lie in substantial synchronization with features newly extracted from the local audio portion 317 as at the time 434. When player 111 pauses for the interval 315, the synchronization unit 130 will have difficulty confirming the timing of the corrective action, since the silent interval 316 might arise as a consequence of the pause, but might also include a quiet portion in the content being played (or have been disrupted by background noise unrelated to the playout by the player 111). Nonetheless, as extraction of features from the audio in portion 317 occurs, the synchronization unit 130 will compare and match the extracted features to those received from the synchronization unit 140, with substantial synchronization occurring during a very short interval (e.g., within 2 seconds, or within ¼ second), as recognized at the time 434. Thereafter, the recognition, unit 130 might signal the recognition unit 140 with a reset/resync notification message (not shown, but similar to the message 414), but occurring at a time after sending the message 434. In either case, after reset message 414 or the like, the synchronization unit 130 will continue to send extracted audio features from the feature extraction module 132 to the remote synchronization unit 140, as with the messages 415, 416.

In some embodiments, a reset message similar to 414 could be sent at time 432, that is, as soon as the synchronization unit 130 has determined to take action to adjust its latency. In such an embodiment, the remote synchronization unit 140 could immediately purge the corresponding buffer for remote audio features timeline.

Figure 5:
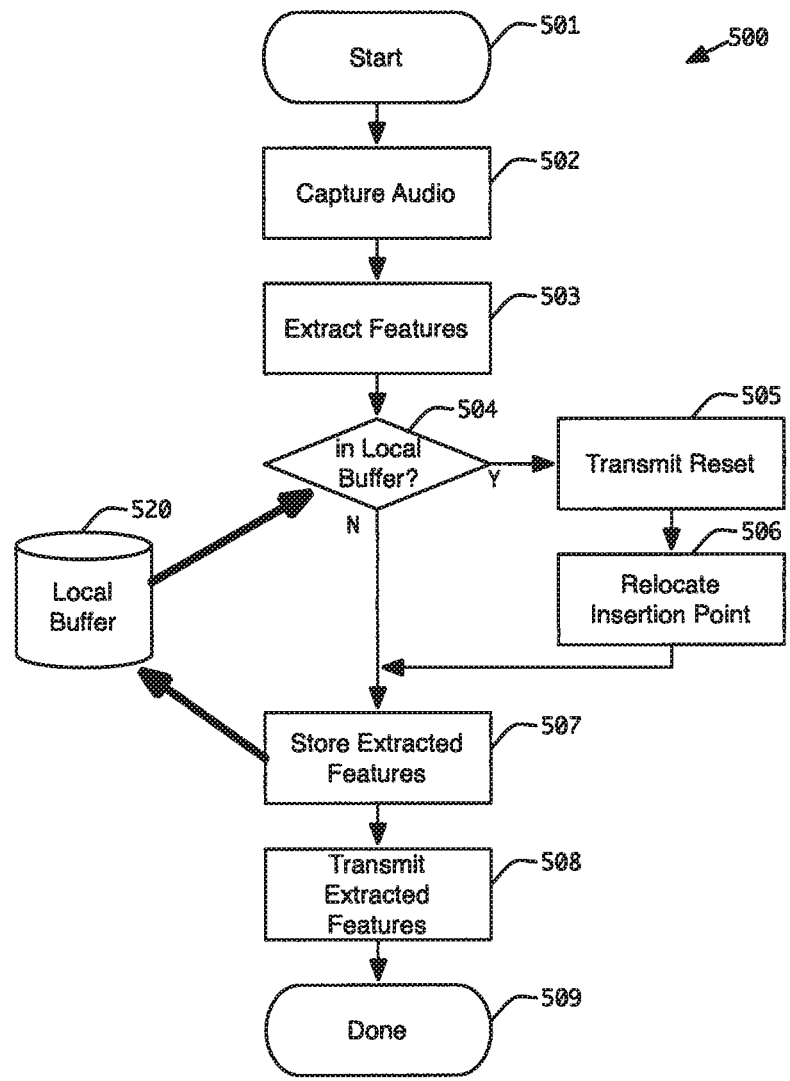
FIG. 5 depicts in flow chart form the steps of an exemplary process for audio characterization at a local station in communication with a remote station.
Figure 6:
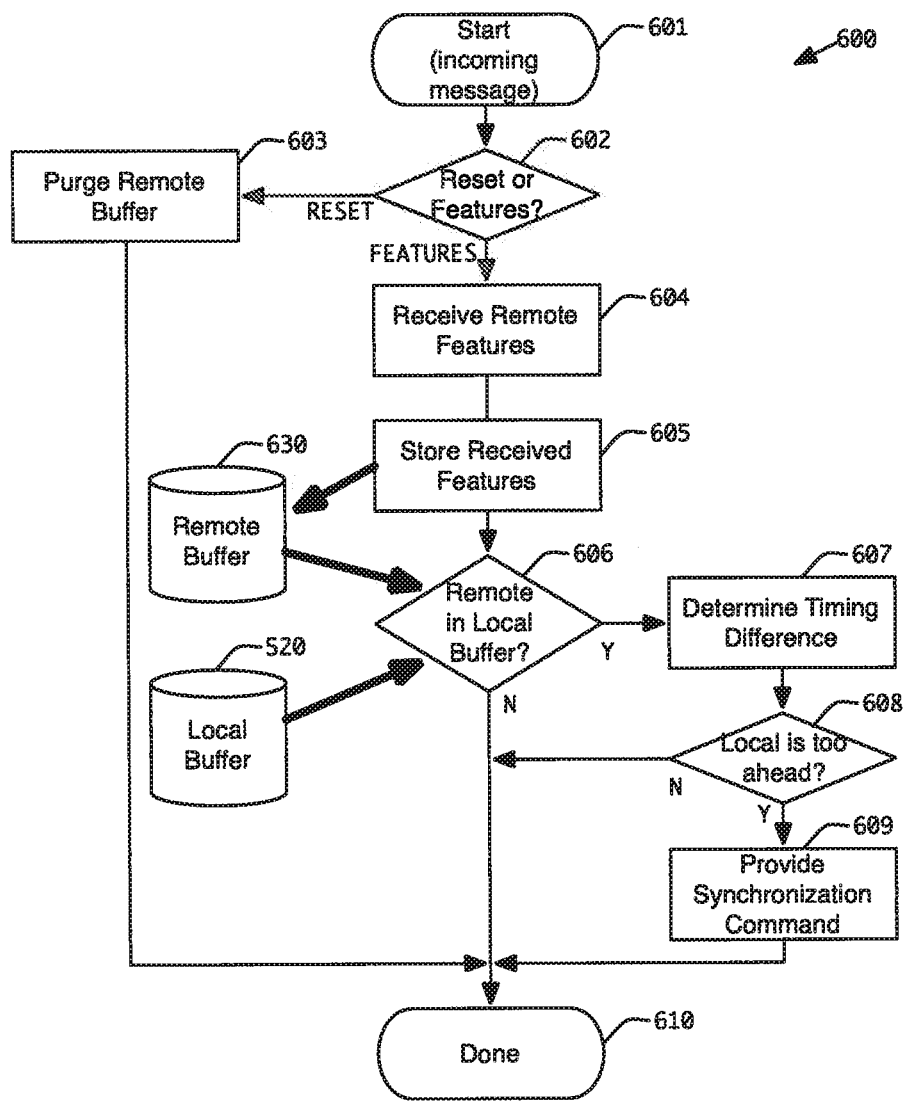
FIG. 6 depicts in flow chart form the steps of an exemplary process that determines the synchronization state between the audio signals from the local and remote telepresence stations of FIG. 1, and indicates and/or corrects any substantial difference therebetween.
Figure 7:
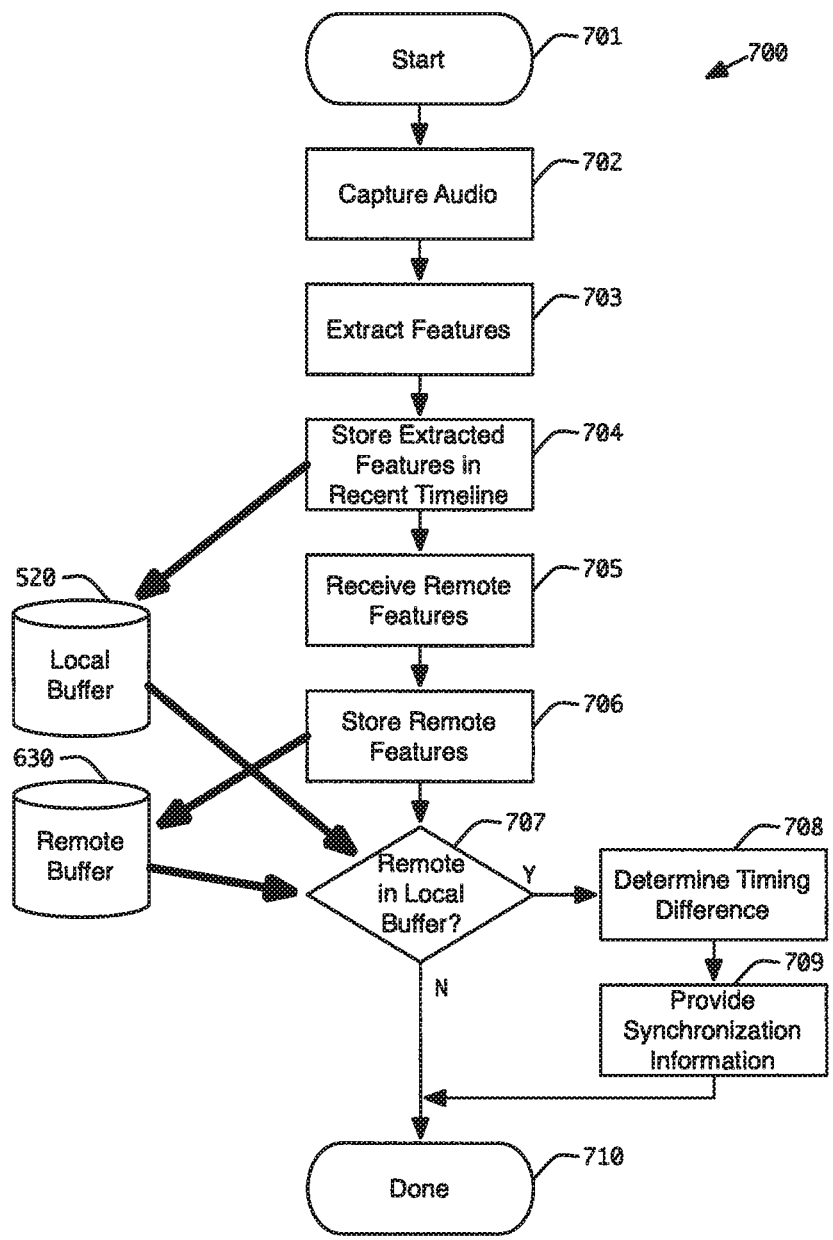
FIG. 7 depicts in flow chart form the steps of an exemplary process for play out synchronization where determination of the synchronization of a local audio source occurs with respect to a remote audio source.

FIGS. 5-7 depict the processes for achieving the behaviors described above with respect to FIG. 4. FIG. 5 depicts in flow chart form the steps of an exemplary process 500 for audio characterization (monitoring) at a local station, e.g., station 110 of FIG. 1 in communication with a remote station, e.g., the station 120. The process 500 commences with a start step 501, at which time, clearing of the audio feature buffer 520 occurs. (The audio feature buffer 520 comprises a portion of the in memory 134.) Further, during step 501, resetting of the insertion point into the feature buffer 520 occurs to place the insertion point at the beginning so the buffer can now record the detected features. At step 502, the microphone 131 of FIG. 1 becomes active to capture the audio 114 and provide it to the feature extraction module 132 of FIG. 1.

During step 503, the feature extraction module 132 examines the captured audio for significant features. Audio feature extraction remains well known, and there exist many possible implementations for the feature extraction module 132 of FIG. 1. The envelope of the audio, in FIGS. 2 and 3 may represent attributes of the features in the audio e.g., quiet portions and peaks. However, envelope- or waveshape-related features can become hidden or corrupted by environmental noise and in some cases do not represent the best features to seek. Various forms of spectral analysis, e.g., the spectra from a short-time Fourier transform (STFT) or Mel Frequency Cepstral Coefficients (MFCC), made over a small window (e.g., 10-100 mS) of the audio can detect desired features. Specific spectral bands or coefficients, up to a predetermined number (e.g., 3) having the highest values, might include features of interest. To qualify as a candidate, a feature could require a sound level at least a predetermined number of decibels above an absolute level or a background noise level, to help eliminate features derived from noise or other background sources unrelated to the audio 114. A windowing function (e.g., Hanning, Hamming, Gaussian, etc.) can serve as a multiplier for the captured audio to reduce extraneous spectral artifacts from the windowing process.

In some embodiments, each consecutive spectral analysis can occur using a window that overlaps associated with the previous analysis (e.g., with a 50 mS wide window, features extraction could occur every 25 mS, or 40 times per second) to minimize variations in feature detections due to timing relationships between windows and the captured audio being analyzed. U.S. Pat. No. 5,437,050 in the name of Lamb et al. describes a similar feature extraction technique.

In U.S. Pat. No. 8,190,435 to Wang et al., entitled, "System and Methods for Recognizing Sound and Music Signals in High Noise and Distortion," described a method for using "landmark timepoints and associated fingerprints" where landmark timepoints" constitute reproducibly detectable locations in the content (e.g., peaks or inflection points in the envelope) and fingerprints represent features of the signal at or near such landmark timepoints. Using timepoints affords the advantage achieving a much thinner set of data representing features compared to a regular, periodic sample. The sound recognition methodology of Wang can facilitate searches within enormous databases, e.g., databases having 10,000 or more songs. While the landmarking and fingerprinting of Wang et al. can perform feature extraction in connection with the present principles, the relatively constrained size anticipated for the extracted feature buffer (e.g., a buffer with less than 30 minutes audio storage capacity), makes the problem of seeking a match within the locally extracted features in memory 314 substantially easier, even when using features extracted from regularly sampled audio. Note that in order to correctly record landmark timepoints, a stable clock 136 will prove useful to determine the relative time of the landmark, although synchronization with remote clock 146 remains unnecessary, nor does the clock need to represent the actual time-of-day. Alternatively, the landmark timepoint could have an association with a sample counter that increments with each audio sample captured.

In the conference paper, "A Large Set of Audio Features for Sound Description", Ircam, Paris, 2004, Peters enumerates a number of instantaneous descriptors for a sound sample, and summarizes the mathematics for computing them. Among these, besides the STFT, are Mel Frequency Cepstral Coefficients, and noisiness. Extraction of most if not all of these features can occur using "YAAFE, an Easy to Use and Efficient Audio Feature Extraction Software", by B. Mathieu et al., as described in the proceedings of the 11th ISMIR conference, Utrecht, Netherlands, 2010 and available as an open source software project developed by Telecom Paristech and available at yaafe.sourceforge.net.

During step 504 of FIG. 5, the synchronization unit, for example, the synchronization unit 130 of FIG. 1, can look for an instance where features extracted from the audio 114 repeat relative to a recently played portion, as might occur if the player 111 receives a command to rewind or skip backward and then resumes play out. In such an instance, the features extracted during step 503, when compared to those already stored in the local buffer 520, would produce a substantial match (though background noise not associated with the audio 114 either now or previously received might otherwise suppress, hide or corrupt individual features whereas other features obtained from the same sample or in the same temporal neighborhood, would match). Further, the feature detection modules 132 and 142 of FIG. 1 could each employ a rule requiring that a substantial portion of the features extracted over a meaningful interval of time (e.g., 2-10 seconds) qualify before being considered a match.

Upon finding a match upon execution of step 504, corresponding to a determination that the audio 114 constitutes a repeat of an earlier portion, then, during step 505, the local station 110 of FIG. 1 sends a message to the remote station 120 to suggest that the remote station purge its buffer of features sent by the local station 110, since that record no longer represents the newly reset timeline of the local station. During step 506, rather than clearing local buffer 520 (which might occur in an alternative embodiment), the local station 110 can modify the insertion point into the buffer to correspond to the position within the local buffer at which the match occurred. In this way, at least for a few moments, the local buffer 520 represents not only the recent history of the audio program, but also somewhat anticipates the near future for that program. This can prove useful if the size 215 of backwards skip was too big and the current features received from remote station 120 match a point slightly in the future relative to the insertion point and would provide information useful for fine-tuning the synchronization (as further discussed in conjunction with FIG. 6).

During step 507, the features extracted during step 503 undergo storage at the current insertion point in the local buffer 520 and the synchronization unit increments the insertion point. If the insertion point resides at the end of the buffer, then the features being stored extend the current length of the buffer. If the buffer cannot exceed a predetermined size, then the oldest features (those earliest in the buffer) get deleted as the new ones get inserted. In some embodiments, a circular buffer can implement this technique of overwriting old data with new data.

During step 508 of FIG. 5, the local station 110 of FIG. 1 sends the features extracted during step 503 to the remote station 120 of FIG. 1. In some embodiments, the local station 110 can time stamp these features with information from the clock 136 and/or the local station can send the features with a sequence number. In this way, the remote station 120 can place the received feature relative to other received features, even if intervening messages get lost, or the remote station receives the messages out of order.

During step 509, the processing of the current interval of audio ends, having been completed, whereupon the process can repeat beginning with step 502. The buffer clearing and insertion point reset of step 501 need not occur with each repeat of the process. In one embodiment, the local audio monitoring process 500 might repeat each time a hardware audio buffer fills, as might typically occur with audio acquisition cards or digital microphone interfaces, and their corresponding drivers.

FIG. 6 depicts in flow chart form the steps of an exemplary process 600 that determines the synchronization state between the audio signals from the local and remote telepresence stations of FIG. 1, and indicates and/or corrects any substantial difference therebetween to synchronize content play out. The process 600 commences with the start step 601 triggered by an arriving message from a remote synchronization unit (e.g., any of messages 412-416 from station 110/synchronization unit 130 of FIG. 1, as received by station 120/synchronization unit 140, or messages 422-423 from station 120/synchronization unit 140 as received by station 110/synchronization unit 130).

During step 602, a determination occurs whether the message received during step 601 constitutes a reset message (e.g., message 414 of FIG. 2) or a remote features message (e.g., any of the messages in FIG. 2 other than message 414). If during step 602, the local station (e.g., the station 110) determines that the remote station (e.g., the station 120) has reset its timeline, then during step 603, the local station purges the buffer 630 of remote features stored in the local memory. Thereafter, step 610 undergoes execution with handling of the reset message now complete.

However, if during step 602, the local station determines that the message contains features, then step during step 604, the local station will receive the remote features. If a timestamp and/or sequence number accompanies the received remote features, the local station will associate the received features appropriately along the timeline as, during step 605 as the features undergo storage in the remote features buffer 630.

During step 606, the local station checks whether a portion of the locally detected features in buffer 520 (as stored during the process 500 of FIG. 5) correspond to the recent timeline of the remote features in the buffer 630. If not, then the processing of the message received during step 601 completes during step 610. However, if during step 606, the local station determines that a recent portion of the remote features in remote buffer 630 correspond to a sequence of those within local buffer 520, then during step 607, the local station determines the timing difference with respect to the current insertion point in the local buffer 520 (as discussed above in connection with process 500) after finding a correspondence of the recent features in remote buffer 630 in local buffer 520.

At step 508 a determination is made as to whether the local playout is too far ahead of the remote playout, if so, then corrective action is initiated at step 609 (e.g., to pause or skip backward). If at 508 a determination is made that the local and remote audio is in sufficient sync (e.g., within a fraction of a second), then no action is taken and the process concludes handling of the current message at 610. In some embodiments, upon finding a correspondence ahead of the insertion point (e.g., where the local player has skipped backward and the insertion point now moves into the past, as during step 506), policy may dictate that under such circumstances, the remote synchronization unit has the responsibility to address the issue, in which case, local handling of the message received during step 601 becomes complete during step 610. However, if the point of correspondence of the recent features in remote buffer 630 lies behind the insertion point, and, indeed, lies behind the insertion point by a sufficient amount (e.g., under one policy, 500 mS or more), then step 609, the local synchronization unit will provide a synchronization command (e.g., to skip forward).

During step 609, the local synchronization unit could provide the synchronization command as advisory only. In other words, the local synchronization unit 130 might show the synchronization command as an alert to the user 115 on the display 137, thereby instructing the user that his local player 111 needs rewinding or pausing for a particular amount of time. In other embodiments, the synchronization unit 130 could use the integral remote control transmitter 138 to rewind or pause the player 111 as needed. In still other embodiments, the local synchronization unit 130 might alert user 115 to the mutual latency value (e.g., latency values 213/313) and offer to take the appropriate action using the remote control 138. This latter approach has particular usefulness if the mutual latency value has become substantial (e.g., more than a few minutes) and would represent a significant "reviewing" by the local user 115, which might not be appreciated.

For embodiments having more than two stations 110 and 120 participating in a telepresence session, a separate process 600 can run locally at each participating remote station, with each station having its own remote buffer 630. Alternatively, depending on the originating remote station, selection of the remote buffer engaged in each of steps 603, 605, and 606 would depend on the message's originating station. Further, with more than one remote station participating, the synchronization command provided during step 609 should correspond to the remote station most behind the other stations.

Consider the following example, which assumes three stations, each having its own synchronization unit. Assume that one of the stations (e.g., the "local" station) communicates with the two other ("remote") stations, and that the local station leads the first remote station by 5 seconds, and leads the second remote station by 12 seconds (i.e., the local station is ahead of both, but by different amounts). Under such circumstances, the synchronization command provided by the local station during step 609 should correspond to the 12 seconds of mutual latency associated with the lead in content between the local station and the second remote station. In such a situation, the first remote station would consider itself to lead the second remote station by 7 seconds and lag 5 seconds behind the local station. Thus the local station would skip back or pause content play out for 12 seconds, while the first remote station would skip back or pause for 7 seconds, with the result that both the local and first remote stations have taken action to synchronize themselves with the second remote station. The second remote station would take no synchronization action, but would be the recipient of two messages to purge its remote buffers, one from each of the other two stations.

FIG. 7 depicts in flow chart form the steps of an exemplary process 700 for content play out synchronization where determination of the synchronization of a local audio source occurs with respect to a remote audio source. The process 700 begins with step 701 with the local synchronization unit initiating communication with a remote synchronization unit. During step 702, the local synchronization unit captures an interval of audio. Upon execution of step 703, the local synchronization unit extracts features from the captured audio. During step 704, the local features detected undergo storage into the local feature timeline in the local feature buffer 520. At this time, the local synchronization unit will send these local features to the remote synchronization unit (step not shown). During step 705, the local synchronization unit will receive features from the remote synchronization unit, and will thereafter store such remote features locally in the remote feature buffer 630 during step 706. During step 707, the local synchronization unit determines whether the recent features stored in the remote buffer 630 match the features in the local buffer 520. If so, then during step 708, the local synchronization unit determines the mutual latency (e.g., latencies 213/313) and thereafter to provides synchronization information accordingly during step 709. Otherwise, or if at step 707 no adequate match exists, then the current iteration of process 700 concludes at step 710.

The "substantialness" of a match, e.g., as determined during steps 504, 606, and 707 constitutes a matter of tuning. When considering the remote features associated with a short interval of remote audio (e.g., 10-100 mS in duration), detecting a match against features within the local buffer 520 may prove relatively easy (because only the most recent remote features undergo matching), but may not provide a reliable indication of the mutual latencies 213/313, since the remote audio characterized by those remote features may occur more than once, or may arise from background noise. Similarly, the strictness of the match required affects the system. For example, in connection with a short interval that produces four detected features, a strict rule might require the presence of all four in the remote features to declare a match. A less strict rule might declare a match based on the presence of any three out of the four. When comparing longer intervals, a station may appear unresponsive if the interval over which the station makes such a match becomes too long (e.g., 20 seconds). A station may appear as too finicky if a match over a longer interval (e.g., 5 seconds) requires correspondence of features in too many consecutive short intervals (e.g., 10-100 mS), or in too great a fraction of the short intervals before recognizing a match. For example, if five straight seconds of unbroken matches between short intervals becomes necessary, the system may not be sensitive to matches in the presence of background noise. The same might be said if the system requires matching of 90-100% of features over a five second interval, where an adequately discriminating station could succeed with as little as 50%, or even fewer features properly spaced on the timeline being matched.

Such tuning depends on the content undergoing play out. When the content audio comprises music, a chorus could repeat at specific intervals. In such cases, an ambiguity could exist regarding whether the features corresponding to the chorus as reported by a remote station comprise one of several historic instances detected locally, or a future instance (not yet detected locally). Fortunately, in most modern television and movie programs, such situations are further differentiated by dialog, sound effects, and other accompaniment, or by verses, which can serve to resolve placement in the timeline. In cases where ambiguity might exist (i.e., because the same series of remote features appear at more than one location in the local feature buffer), the synchronization unit can increase the size of the interval being compared until the ambiguity becomes clarified. For example, if there exist three copies of a 5-second series of features in the local buffer, the local synchronization unit could resolve this ambiguity by temporarily increasing the length of the interval of features being compared, e.g., to 10- or 15-seconds.

Where possible, if a local player 111 receives a command to skip forward or to change channels other than as recommended by the synchronization unit 130, and if the synchronization unit 130 can detect such an action, the local feature buffer 520 in memory 134 should get purged, and a message (like e.g., 414) sent to notify each remote synchronization unit of the resetting of the buffer so that they can do the same to their corresponding remote feature buffers 630. Such a detection can occur by monitoring for discontinuities in the audio 114, as some players 111 produce a predetermined interval of silence when changing channels or skipping forward. In other cases, by eavesdropping on manual remote control 116, the synchronization unit 130 could detect manually initiated remote control commands intended for the player 111 by using a remote control receiver, not shown, connected to controller 133, that allows detection of such commands. Upon detecting such a discontinuity or command, the local synchronization unit can conduct a search, such as during step 506, to determine if the new play out point still lies within the local buffer, and if not, the local synchronization unit will purge the local buffer.

FIG. 8 depicts a set of vignettes 800 that represent the situations at the stations 110 and 120 of the telepresence system of FIG. 1 in connection with synchronization in accordance with the present principles. The vignette at the upper left-hand corner of FIG. 1 depicts the user 115 at station 110 watching a program on monitor 112 while sitting on a couch 816 in front of a telepresence monitor 137 with co-located telepresence camera 830. The vignette at the upper right-hand corner of FIG. 8 depicts a user 825 at the station 120 watching the same show on a monitor 122 while sitting on a couch 826, in front of a telepresence monitor 147 with co-located telepresence camera 840. Images captured by each of the telepresence cameras 830 and 840 undergo display on the mutually remote telepresence monitors 147 and 137, respectively. Thus, telepresence monitor 147 shows image 820 (at the lower right-hand corner of FIG. 8) which comprises a profile view of user 115 captured by telepresence camera 830. Likewise, telepresence monitor 137 shows image 810 (at the lower left-hand corner of FIG. 8) which comprises a profile view of user 825 captured by telepresence camera 840. Note that in this embodiment, where the telepresence stations 110 and 120 have embedded synchronization units 130 and 140, respectively, the telepresence monitors 137 and 147 are also serve as the displays the for synchronization units 130 and 140, respectively.

When the synchronization unit 130 executes the process 600 of FIG. 6 will thus display messages for the user 115 on the telepresence monitors 137 in connection with content synchronization. For example, assume that the synchronization unit 130 determines, based on remote feature messages received from station 120, that the local program undergoing play out on the monitor 112 leads the remote playout of the program on monitor 122 by six seconds ahead. Under such circumstances, the synchronization unit 130 will provides a synchronization command 812, displayed on display/telepresence monitor 137, to user 115 instructing him or her to pause play out for six seconds, which the user can do using the remote control 116 to command the player 111 accordingly. By pausing the player 111, the user 115 will effectively synchronize the content undergoing local play out with the content undergoing remote play out.

The foregoing describes a technique for synchronizing the play out of content at a local and a remote station.

The invention claimed is:

1. A method comprising:
    extracting, at a first station, at least a plurality of first features from audio captured by a first microphone at the first station;
    receiving, at the first station from a communication network, at least a plurality of second features of audio captured by a second microphone at a second station, the second features being extracted at the second station, each of the first features and the second features forming an identifiable representation of aspects of the corresponding captured audio;
    storing the received plurality of second features in a buffer at the first station;
    comparing the extracted plurality of first and second audio features to determine if a latency exists between the first and second stations, and if so, then
    generating synchronization information to initiate at least one of a pause or jump operation in connection with content playing out by at least one of the first and second stations for an interval corresponding to an interval by which one station leads the other station to synchronize content undergoing play out at the first and second stations; and
    purging the buffer once said content undergoing play out at the first and second stations is synchronized, said purging being a different event from an end of the content play out, and being performed in response to a reset message indicating the content play out being synchronized.

2. The method according to claim 1, wherein the comparing further comprises:
    matching at least some of the plurality of the first plurality of first features with at least some of the plurality of the plurality of second features; and
    determining from the matched first and second features which of the first and second stations leads the other.

3. The method according to claim 2, wherein the matching further comprises matching a first number of the first features with second number of the second features.

4. The method according to claim 1, wherein the at least one of the pause or jump operations is performed manually by an operator in response to a display of a message commanding the operator to perform such operation for the interval corresponding to an interval by which the one of the first and second stations leads the other station.

5. The method according to claim 1, wherein one of a pause or jump backwards operations is performed by a leading one of the first and second stations.

6. The method according to claim 1, wherein a lagging one of the first and second stations performs a jump forward.

7. The method according to claim 1, wherein both a leading one of the first and second stations performs one of a pause or jump backwards operations while a lagging one of the first and second stations performs a jump forward operation.

8. An apparatus at a first station, the apparatus comprising:
    a first microphone, a network interface and a processor configured to:
        extract at least a plurality of first features of audio captured by the first microphone from the content undergoing play out at the first station;
        receive from the network interface at least a plurality of second features from audio captured by a second microphone from the content undergoing play out at a second station, wherein the second features are extracted at the second station, each of the first features and the second features forming an identifiable representation of aspects of the corresponding captured audio;
        store the received plurality of second features in a buffer at the first station;
        compare the extracted first and second plurality of audio features to determine if a latency exists between the first and second stations;
        generate synchronization information to initiate at least one of a pause or jump operations in connection with content play out at one of the first and second stations leading station for an interval corresponding to an interval by which one station leads the other station to synchronize content undergoing play out at the first station with content undergoing play out at the second station; and
        purge the buffer once said content undergoing play out at the first and second stations is synchronized, said purging being a different event from an end of the content play out, and being performed in response to a reset message indicating the content play out being synchronized.

9. The apparatus according to claim 8, wherein the processor is further configured to compare the extracted pluralities of first and second audio features by matching a first number of the first features with a second number of the second features.

10. The apparatus according to claim 8, wherein the synchronization information comprises a display message to an operator to signal the operator to manually perform one of the pause or jump operations is for the interval corresponding to an interval by which the one of the first and second stations leads the other station.

11. The apparatus according to claim 8, wherein the synchronization information comprises a command to a content player at the first station to perform one a pause or jump backward operations when first station leads the second station.

12. The apparatus according to claim 8, wherein the synchronization information comprises a command to a content player at the second station to perform a jump forward operation when first station leads the second station.

13. The apparatus according to claim 8, wherein the synchronization information comprises a first command to a content player at the first station to perform one a pause or jump backward operations when first station leads the second station and second command to a content player at the second station to perform a jump forward operations when first station leads the second station.

\* \* \* \* \*